United States Patent
Albesa et al.

(10) Patent No.: US 11,914,718 B2
(45) Date of Patent: Feb. 27, 2024

(54) SECURED BOOT OF A PROCESSING UNIT

(71) Applicants: STMicroelectronics (Alps) SAS, Grenoble (FR); STMicroelectronics (Grand Ouest) SAS, Le Mans (FR)

(72) Inventors: Franck Albesa, Parigne l'eveque (FR); Nicolas Anquet, Grenoble (FR)

(73) Assignees: STMicroelectronics (Alps) SAS, Grenoble (FR); STMicroelectronics (Grand Ouest) SAS, Le Mans (FR)

(*) Notice: Subject to any disclaimer, the term of this patent is extended or adjusted under 35 U.S.C. 154(b) by 87 days.

(21) Appl. No.: 17/657,027

(22) Filed: Mar. 29, 2022

(65) Prior Publication Data

US 2022/0318392 A1    Oct. 6, 2022

(30) Foreign Application Priority Data

Mar. 31, 2021  (FR) ...................... 2103313

(51) Int. Cl.
*G06F 21/57* (2013.01)
*G06F 9/4401* (2018.01)
*G06F 21/60* (2013.01)

(52) U.S. Cl.
CPC .......... *G06F 21/575* (2013.01); *G06F 9/4403* (2013.01); *G06F 21/602* (2013.01); *G06F 2221/034* (2013.01)

(58) Field of Classification Search
CPC .... G06F 21/575; G06F 9/4403; G06F 21/602; G06F 2221/034
See application file for complete search history.

(56) References Cited

U.S. PATENT DOCUMENTS

| | | | |
|---|---|---|---|
| 8,184,812 B2 * | 5/2012 | Margolis | G06F 21/57 726/16 |
| 10,659,054 B2 * | 5/2020 | Werner | H03K 21/38 |
| 10,868,679 B1 * | 12/2020 | Van Antwerpen | G06F 21/575 |
| 2006/0090084 A1 | 4/2006 | Buer | |
| 2014/0310535 A1 | 10/2014 | Sibert | |
| 2019/0286823 A1 * | 9/2019 | Walrant | H04L 9/3236 |
| 2022/0294644 A1 * | 9/2022 | Liu | H04L 9/3247 |

FOREIGN PATENT DOCUMENTS

WO    2019239121 A1    12/2019

OTHER PUBLICATIONS

Sarmenta, Luis F., et al., "Virtual Monotonic Counters and Count-Limited Objects using a TPM without a Trusted OS", STC'06, Nov. 3, 2006, US, 15 pages.

* cited by examiner

*Primary Examiner* — Glenn A. Auve
(74) *Attorney, Agent, or Firm* — Slater Matsil, LLP

(57) ABSTRACT

The present disclosure relates to a method for booting a processing device, the method including: generating, by a monotonic counter and during a first boot phase, a first count value; transmitting, by the monotonic counter, the first count value to an access control circuit of a memory; reading, on the basis of the first count value, first data stored in the memory; and generating, by the monotonic counter and during a second boot phase, a second count value greater than the first count value. The access control circuit of the memory is configured so that the reading of the first data is not authorized on the basis of the second count value.

19 Claims, 4 Drawing Sheets

SECURED BOOT OF A PROCESSING UNIT

CROSS-REFERENCE TO RELATED APPLICATIONS

This application claims priority to French Application No. 2103313, filed on Mar. 31, 2021, which application is hereby incorporated herein by reference in its entirety.

TECHNICAL FIELD

The present disclosure relates to the field of methods and devices for securing electronic circuits, and in particular to a device and method for performing a secure boot of such a circuit.

BACKGROUND

The boot of a processing device is based on the execution of codes such as software and/or firmware codes. The boot sequence of a device is a sensitive step in terms of security, as it usually involves the setting of parameters related to the security of the device and/or the processing of sensitive data in terms of confidentiality, integrity and authenticity such as encryption keys.

Although solutions exist to make boot codes immutable, it would be desirable to further protect access to these codes and to sensitive data when booting up a processing device.

SUMMARY

There is a need to improve the security of boot procedures for processing devices.

Embodiments herein address all or some of the drawbacks of known processing devices.

One embodiment provides a method for booting a processing device, the method comprising: generating, by a monotonic counter and during a first boot phase, a first count value; transmitting, by the monotonic counter, the first count value to an access control circuit of a memory; reading, on the basis of the first count value, first data stored in the memory; generating, by the said counter and during a second boot phase, a second count value higher than the first count value, the access control circuit of the memory being configured so that the reading of the first data is not authorized on the basis of the second count value.

According to one embodiment, the first data comprises first boot codes.

According to one embodiment, the first boot codes are executed prior to the monotonic counter generating the second count value, the first boot codes comprising an instruction to increment the monotonic counter to cause the second count value to be generated.

According to one embodiment, the memory is a volatile memory.

According to one embodiment, the memory is a non-volatile memory.

According to one embodiment, the memory access control circuit is configured such that reading of the first data is not authorized based on a count value being greater than the first count value.

According to one embodiment, the method further comprises reading, based on the first count value, second data stored in the memory and associated with a second boot phase.

According to one embodiment, the method further comprises: transmitting, by the monotonic counter, the second count value to the memory; and reading of second and/or third data stored in the memory based on the second count value.

According to one embodiment, the first count value corresponds to an initialization value of the monotonic counter at a first boot of the processing device, the method further comprising, a second boot of the processing device during which the monotonic counter is initialized to the second count value.

According to one embodiment, the method further comprises another boot of the processing device, after the first and second boot, at which time the monotonic counter is initialized again to the first count value if a condition on the state of the device is satisfied.

According to one embodiment, the condition on the state of the processing device corresponds to the programming state of one or more bits stored in a non-volatile manner in an area of the memory or another memory.

According to one embodiment, the method further comprises, prior to generating the second count value, reading, based on the first count value, one or more first encryption keys stored in the memory, the memory access control circuit being configured such that reading of the first encryption keys is not authorized based on a count value greater than the first count value.

According to one embodiment, the method further comprises, after generating the second count value, reading, based on the second count value, one or more second encryption keys stored in the memory.

One embodiment provides for a data processing device comprising: a monotonic counter configured to generate a first count value; and a memory comprising an access control circuit and containing a first boot code, the access control circuit configured to: read, based on the first count value, first data; and to not authorize the first data to be read based on a second count value generated by the monotonic counter that is greater than the first count value.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, the design of processing devices is well known to the person skilled in the art and certain elements have not been detailed in the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
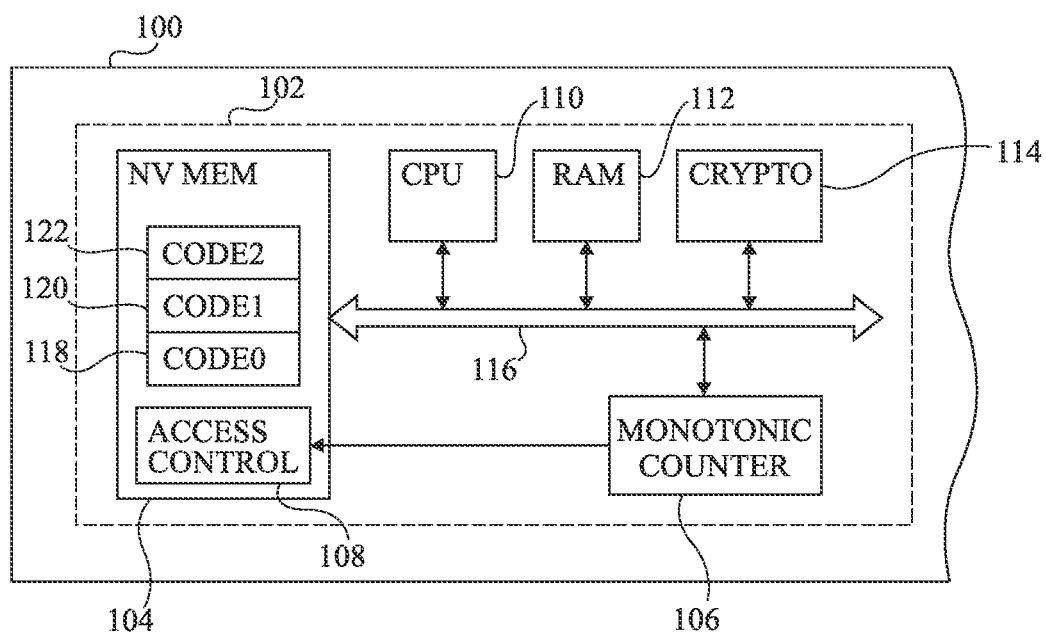
FIG. 1 schematically represents, in block form, one embodiment of a processing device according to one embodiment of the present description.

FIG. 1 represents, very schematically and in block form, an electronic device 100 comprising a processing device 102 according to one embodiment of the present description.

The electronic device 100 is, for example, an electronic card such as a microcircuit card, hardware for computer use, microprocessor circuit, etc.

The processing device 102 comprises, for example, a non-volatile memory 104 (NV MEM), such as a flash memory. The memory 104 comprises an access control circuit 108 (ACCES CONTROL) connected to a monotonic counter 106 (MONOTONIC COUNTER).

Monotonic counters are known in the background art, an example of such a counter being described in the publication "Virtual Monotonic Counters and Count-Limited Objects using a TPM without a Trusted OS" by L. F. G. Sarmenta, M. Van Dijk, C. W. O'Donnell, J. Rhodes and S. Devadas, for example in part 3, the paper being incorporated herein by reference in its entirety. This paper describes embodiments of a counter implemented in hardware and/or software form. For example, the monotonic counter 106 is implemented in hardware form by a digital circuit, such as an Application Specific Integrated Circuit (ASIC). The monotonic counter is configured to maintain a count value, accessible at an output of the counter. Following an increment command, the monotonic counter increases its count value by one or more units but, following each increment, the operation is not reversible. Indeed, the monotonic counter is configured so that its count value never decreases. Moreover, between two increments, the count value is protected against any modification, so that it cannot be erased or changed. Only the increment instruction allows the current value to be replaced by a new value which is higher than the current value.

The monotonic counter 106 is configured so that no instruction, other than a reset to zero of the processing device, allows the return to the previous value once the increment instruction is executed. In the case where the count value is stored in a volatile manner, each time the processing device is turned off, the count value is lost and each time the device is rebooted, the monotonic counter generates an initial count value again. In the case where the count value is stored in a non-volatile storage element, upon each reboot, an initial count value is, for example, written back to the non-volatile storage element of the monotonic counter.

The processing device 102 may further comprise a generic processor 110 (CPU). For example, the generic processor no may be coupled via a bus 116 to the monotonic counter 106 as well as to a RAM (random access memory) 112 and to the non-volatile memory 104. The memory 112 and/or the memory 104 store, for example, instructions for controlling the processor no. The generic processor no may be further coupled via the bus 116 to a cryptographic processor 114 (CRYPTO). The cryptographic processor 114 receives, via the bus 116, encrypted data and returns the decrypted data and/or receives, via the bus 116, unencrypted data and returns the encrypted data.

The non-volatile memory stores, for example, a plurality of boot codes, and/or other data, which are associated with a plurality of temporal isolation levels (TILs). The boot codes are for example software and/or firmware codes. In the example of FIG. 1, the non-volatile memory 104 comprises a first area 118 in which a first boot code and/or first data (CODE0) is stored. The memory 104 further comprises a second area 120 in which a second boot code and/or second data (CODE1) is stored, as well as a third area 122 in which a third boot code and/or third data (CODE2) is stored. The first, second and third boot codes and/or data are, for example, associated with three corresponding isolation level TIL values. Although the case of three data sets is illustrated in FIG. 1, in other embodiments, the non-volatile memory 104 may store only two data sets, or more than three data sets, in corresponding areas. As an example, the first, second, and third data sets include first, second, and third boot codes.

The TIL isolation level depends on the count value generated by the monotonic counter 106. In one example, the TIL value is equal to the count value of the monotonic counter 106, although it would be possible to change the count value to generate the TIL value.

During a boot, the reading of the first, second, and third codes and/or data and/or the execution of the first, second, and third boot codes, are performed in steps, with each step associated with a corresponding isolation level. The access control circuit 108 in the memory 104 is configured so that the reading of these codes/data is controlled based on the isolation level of the step. The first data and/or code is, for example, associated with the isolation level or TIL value, 0 and the access control circuit 108 is configured so that this data and/or code is only accessible for reading when the current TIL count value is equal to 0. When the count value is incremented, for example as a result of the execution of the first code, the access control circuit 108 locks the area 118, the first data and/or code are then no longer accessible for reading. Following an increment, the current count value increases to, for example, 1 and the data and/or boot codes associated with isolation level 1, for example, the second boot code, are executed.

In some certain cases the access control circuit 108 is configured to allow reading of one or more data associated with isolation levels higher than the current TIL value. The lower the isolation level, the greater the level of protection. The isolation level 0 is therefore the level providing the most protection, because the corresponding data can only be read when the count value is equal to 0. Thus, each isolation level corresponds to a level of protection of the contents of the memory areas associated with it.

The access control mechanism implemented by the circuit 108 may be implemented in several ways.

In a first example, when the circuit 108 receives a read request associated with one or more addresses in the memory 104, it is configured to compare this/these address(es) to the address ranges associated with the areas 118, 120, 122 of the memory 104. If it is an address in an area associated with a TIL value less than the current value, the circuit 108 is configured, for example to block the read operation.

In a second example, the circuit 108 is configured to disable a read circuit of any area 118, 120, 122 of the memory 104 associated with a TIL value less than the current value. For example, one or more logic gates, such as OR gates or AND gates, are coupled to the output path of each area 118, 120, 122 of the memory 104 and also receive an enable signal generated on the basis of the TIL value to selectively disable each output path.

The fact that the count value cannot be decremented during the period of operation of the device 100 allows for the protection of boot codes once they are executed, as the access control circuit 108 prevents the reading of data and/or execution of codes associated with TIL values lower than the current level.

In some embodiments, one or more of the data and/or boot codes and associated isolation levels are reserved for set-up phases of the device 102 or for separate entities in the chain from manufacturer to end user. For example, an intermediate entity between the manufacturer of the processing device and the end user of the electronic device 100 may be required to install boot data and/or codes that are specific to the use of the device 100. In this case one or more of the "lowest" data and/or boot codes, for example associated with isolation level 0, are, for example, reserved for the manufacturer of the processing device 102, and other data and/or boot codes are reserved for the intermediate entity.

Figure 2:
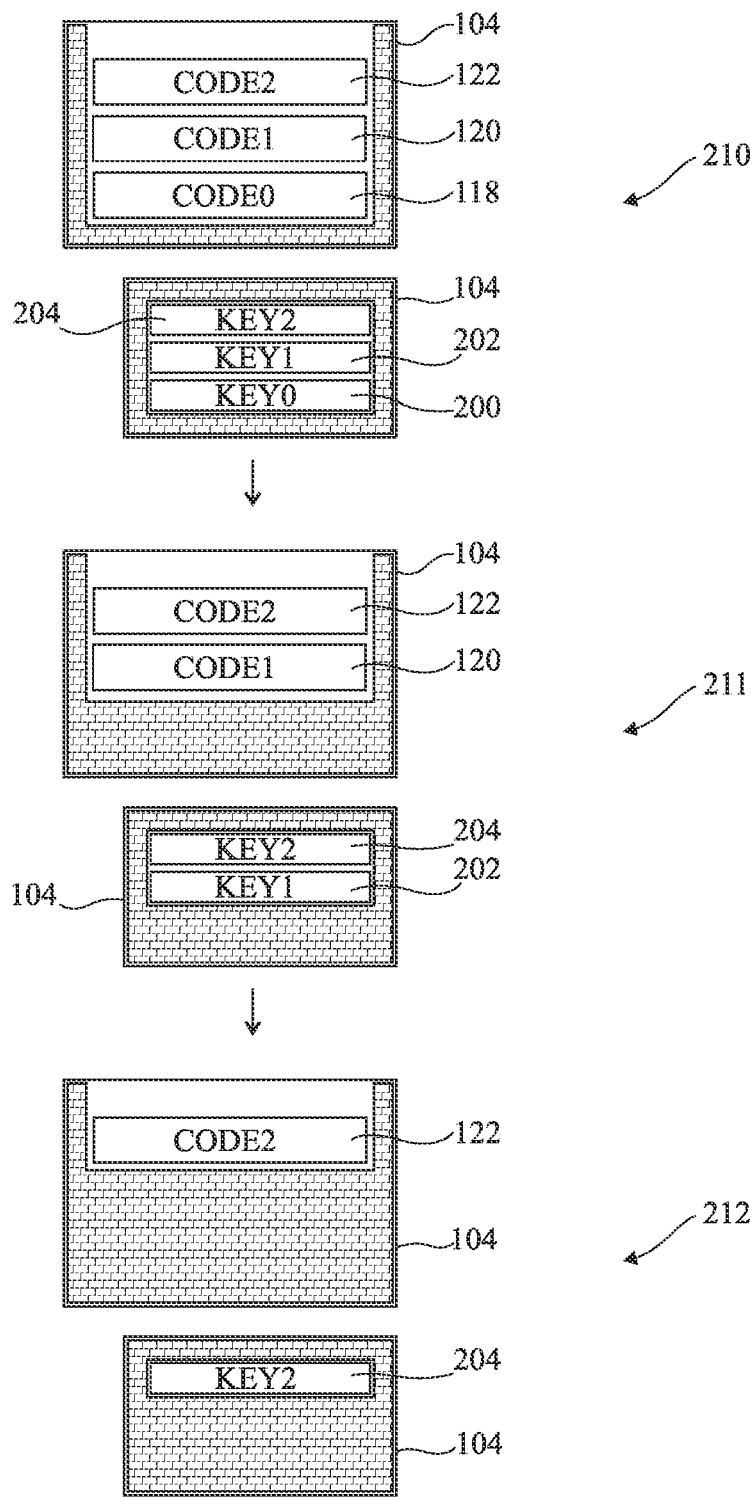
FIG. 2 schematically represents data and codes accessible during a secure boot according to one embodiment of the present description.

The contents of the memory areas 118, 120, and 122 comprise, in some embodiments, other data in addition to the boot codes of the processing device. For example, other confidential, sensitive data is stored in association with at least one of the first, second, and third codes and/or data. For example, such other data comprises encryption keys used in the execution of the associated boot codes. In the example of FIG. 2, the memory areas 200, 202, and 204 store sensitive data associated respectively with the boot codes 118, 120, and 122 stored in the non-volatile memory 104. The areas 200, 202, and 204 are, for example, separate areas from the areas 118, 120, and 122, but remain associated with an isolation level corresponding to that of the boot codes to which the data is associated. This sensitive data includes, for example, one or more encryption keys stored in each area 200, 202, and 204, and each of these areas is contained in the non-volatile memory 104. According to another embodiment, each area 200, 202 and 204 is a sub-area of the corresponding area 118, 120 and 122.

FIG. 2 represents data and codes accessible during a secure boot according to one embodiment of the present description.

During a first step 210 of booting the processing device illustrated at the top of FIG. 2, the current count value is, for example, equal to 0. In the example of FIG. 2, an isolation level 0 is associated with a first code (CODE0) as well as the first sensitive data (KEY0). The access control circuit 108 is configured, for example, so that this first code and these first data are exclusively accessible when the current count value is equal to 0. However, during the step 210, the access control circuit allows, for example, access to all memory areas 200, 202 and 204, as well as to all areas 118, 120 and 122. Indeed, in some cases, in order to, for example, anticipate subsequent steps in the boot process, one or more of the other boot codes CODE1, CODE2 are accessible to read during step 210.

For example, once the first code (CODE0) is executed, the generic processor 110 instructs a first increment of the current count value by the monotonic counter 106. For example, the first code comprises an instruction requesting the increment of the counter. This instruction is, for example, transmitted to a control register (not illustrated) of the monotonic counter.

After this first increment, the current count value of the monotonic counter 106 is, for example, equal to 1, corresponding to the second boot step 211. The access control circuit 108 receives the new current count value, and is configured to prevent, based on this count value greater than 0, any access to the first code as well as to the first data that is associated with the isolation level 0. In other words, the memory areas 118 and 200 are locked, based on any count value strictly greater than 0.

The isolation level 1 is associated with a second code (CODE1) contained in the area 120 as well as with the second data (KEY1) contained in the area 202. According to one embodiment, the third code (CODE2), for example associated with the isolation level 2 and contained in the area 122, is accessible for reading based on the current count value equal to 1.

For example, once the second code (CODE1) is executed, the generic processor 110 instructs a second increment of the current count value by the monotonic counter 106. For example, after this second increment, the current count value of the monotonic counter 106 is equal to 2, corresponding to the third boot step 212. The isolation level 2 is associated with the third code (CODE2) as well as the third data (KEY2). The access control circuit 108 receives the new count value, and is configured to prevent, based on this count value greater than 1, any access to the first and second codes as well as the first and second data that are associated with the isolation levels less than or equal to 1.

According to one embodiment, when the last boot code is executed, for example the third boot code, the generic processor 110 controls a third increment of the current count value by the monotonic counter. The access control circuit 108 then locks out all access to the first, second, and third boot codes and the first, second, and third data.

According to another embodiment, when the last boot code is executed, such as the third boot code, the current count value is not incremented by the monotonic counter 106 and access to the third boot code as well as the third data remains authorized by the access control circuit.

Figure 3:
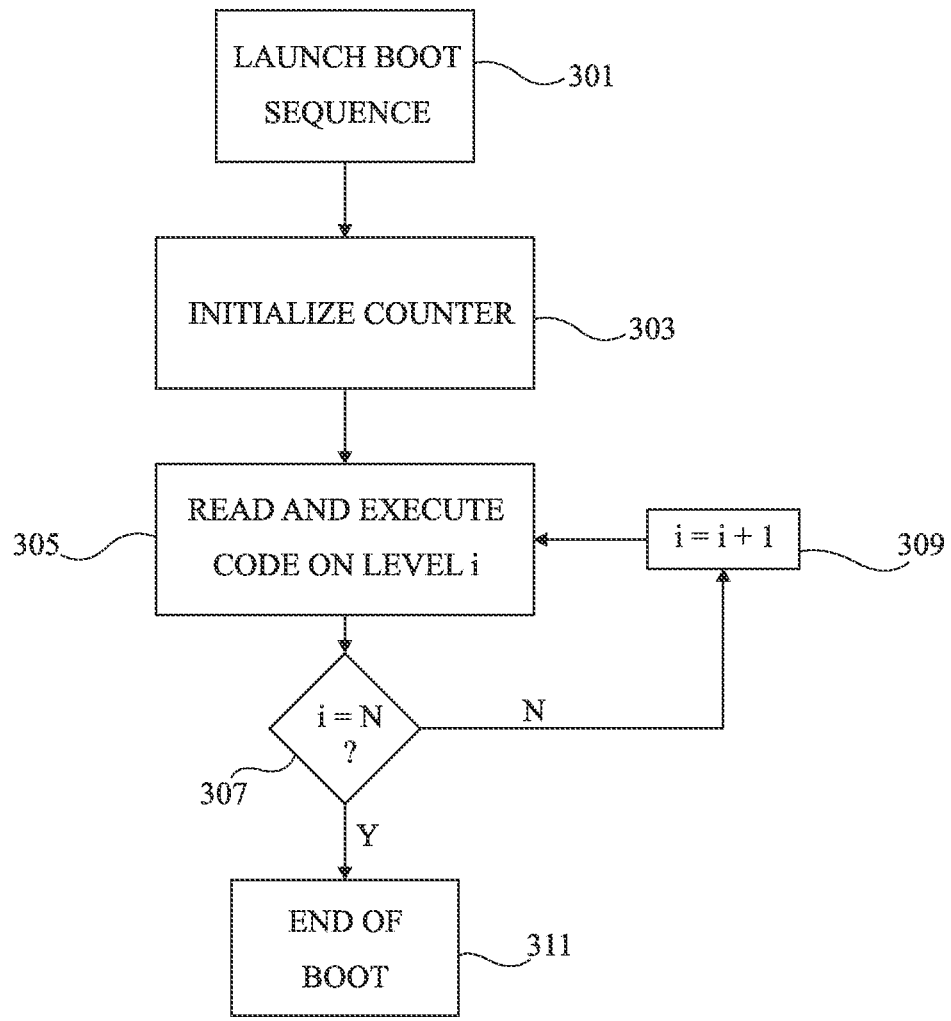
FIG. 3 illustrates a flowchart representing operations of a secure boot method of a processing device according to an example of one embodiment of the present description.

FIG. 3 is a flowchart representing the operations of a secure boot method of a processing device according to an example of one embodiment of the present description. This method is implemented, for example, by the generic processor 110, the monotonic counter 106, and the access control circuit 108 of the processing device of FIG. 1.

In a step 301 (LAUNCH BOOT SEQUENCE) the processing device 102 starts. In one example this is the first boot of the device 102 after manufacture. In another example it is a boot performed by an intermediate entity between the manufacturer of the device 102 and its end user. In yet another example, it is a so-called operational boot of the electronic device 100 performed by the end user.

In a step 303 (INITIALIZE COUNTER), subsequent to step 301, the monotonic counter is initialized to an initial value, being a natural number. In the example in which the count value is stored in a volatile manner, each boot of the processing device causes the count value to be initialized, for example to 0 or to 1. In another example in which the count value is stored on a non-volatile storage element, each boot of the processing device causes the current count value to be replaced with the initial count value, for example equal to 0 or to 1.

In some embodiments, the initial count value generated following a boot may vary according to the state, or context, of the processing device 102. For example, one or more count values corresponding to one or more isolation levels reserved for an initial set-up phase of the device 102, comprising, for example, the installation of firmware. The data and/or codes associated with these isolation levels are, for example, used for this initial set-up.

For example, following manufacture, the processing device 102 has the context "blank" and the initial count value is equal to a value reserved for set-up, such as 0. Once the set-up is complete, the context of the device becomes, for example, "set-up complete". With this new context, booting the device 102, for example by an intermediate entity between the manufacturer and the end user and/or by the end user, will then trigger a count value greater than the reserved count value, and for example equal to 1. The boot code(s), as well as the sensitive data, associated with the isolation level corresponding to the reserved count value will, therefore, be inaccessible.

For example, the context of the device is detected by the presence of a voltage on a boot pin of the device, this voltage being applied, for example, by adding a jumper between the boot pin and another pin at a supply voltage. Additionally or alternatively, the context of the device is detected by the value of one or more bits stored in a non-volatile, protected manner in memory 104, or in another memory.

In one example, the generic processor 110 is configured to detect the context of the device 102 upon booting the device 102, and to configure the initial count value of the monotonic counter 106 accordingly. In another example, the monotonic counter 106 is configured to detect the context of the device 102 itself and to configure its initial count value itself, upon booting the device 102.

In a step 305 (READ AND EXECUTE CODE ON LEVEL i), subsequent to step 303, the data and boot codes associated with isolation level i are read by the generic processor 110 and the boot codes associated with isolation level i are executed. Once the codes of level i are executed, the generic processor 110 compares, in a step 307 (i=N?) the count value i to the value N, where N is the count value associated with the last step in the boot sequence, in other words, the boot codes of isolation level N are the last to be executed according to the embodiment of the present description. For example, in the example of FIG. 2, N is equal to 2. If i is not equal to N (N branch), the method continues in a step 309 (i=i+1) in which the generic processor triggers the increment of the count value. For example, the count value increases from i to i+1. It is also possible that the increment increases the count value by several units. The method then resumes at step 305.

In the event that, as a result of the comparison step 307, the count value is equal to N (Y branch), the method concludes with a step 311 (END OF BOOT) in which the boot of the processing device ends. According to one embodiment, the current count value remains equal to N following step 311. According to another embodiment, the count value is incremented in step 311, and the current count value becomes equal to N+1. In this second embodiment, the access control circuit is then configured to prevent access to all boot codes based on this count value.

Figure 4:
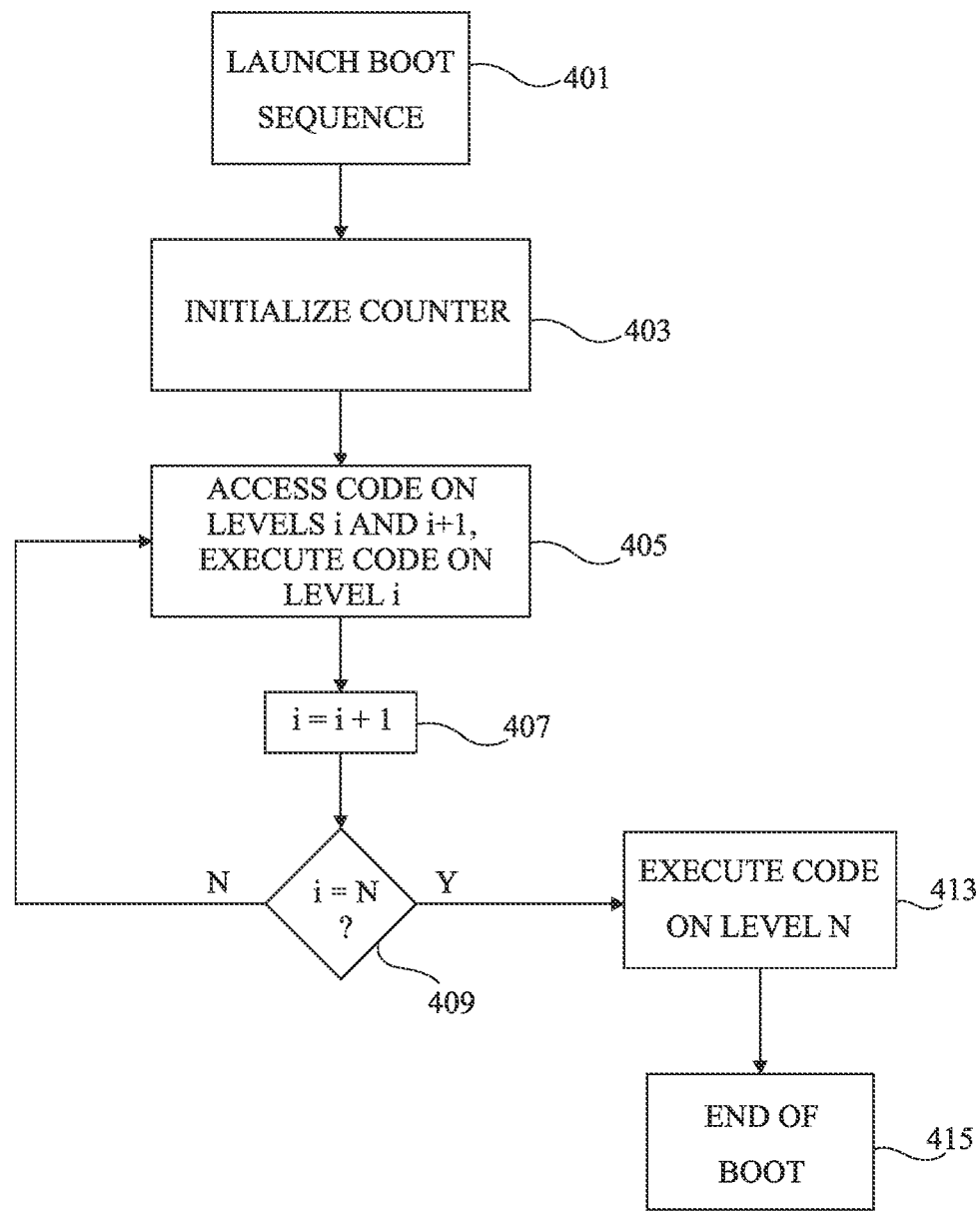
FIG. 4 illustrates a flowchart representing operations of a secure boot method of a processing device according to another example of one embodiment of the present description.

FIG. 4 is a flowchart representing operations of a secure boot method of a processing device according to another example of one embodiment of the present description. This method is implemented, for example, by the generic processor 110, monotonic counter 106, and access control circuit 108 of the processing device of FIG. 1.

The steps 401 and 403 are similar to steps 301 and 303 of FIG. 3 and will not be described again in detail.

In a step 405 (ACCESS CODE ON LEVELS i AND i+1, EXECUTE CODE ON LEVEL i), subsequent to step 403, the data and boot codes associated with the isolation levels i+1 are accessed by the generic processor 110 and the boot code(s) associated with the isolation level i are executed.

In one example, the data or codes associated with isolation level i contain one or more encryption keys, encrypted or unencrypted, which will be used when executing one or more codes associated with the isolation level i+1. Thus, a write access is, for example, authorized on the memory area(s) associated with the isolation level i+1 in order to provision the keys to the codes associated with the isolation level i+1.

In another example, the codes associated with isolation level i contain instructions to verify the integrity of the data and/or codes associated with isolation level i+1. Thus, read access to the memory area(s) associated with the isolation level i+1 is permitted in order to perform this verification.

In a step 407 (i=i+1), subsequent to step 405, the count value is incremented. For example, the count value increases from i to i+1. In other examples, the increment increases i by several units.

In a step 409 (i=N?) the generic processor 110 compares the count value i to the value N, where N is defined as described, relative to step 307 of FIG. 3. If the value i is not equal to N (N branch) the method returns to the step 405.

In the event that in the comparison step 409, the count value is equal to N (Y branch), the method continues to a step 413 (EXECUTE CODE ON LEVEL N) wherein the boot code(s) associated with the isolation level N is executed.

The boot of the processing device ends with a step 415 (END OF BOOT), which is similar to step 311 in FIG. 3, and is not described again in detail.

The method whose implementation is presented in FIG. 4 allows for a staggered reading of the boot codes. Indeed, the boot codes associated with an isolation level are read when the count value is lower than the isolation level value. This saves time compared to the implementation of the method presented in FIG. 3.

One advantage of the described embodiments is that boot codes, as well as confidential sensitive data, are substantially protected by the use of a monotonic counter to lock out access to codes and/or data.

Another advantage of the described embodiments is that it is easily adaptable to multiple boot architectures.

Various embodiments and variants have been described. Those skilled in the art will understand that certain features of these embodiments can be combined and other variants will readily occur to those skilled in the art. In particular, different types of processors may be used. In addition, the number of isolation levels may vary.

Finally, the practical implementation of the embodiments and variants described herein is within the capabilities of those skilled in the art based on the functional description provided hereinabove.

What is claimed is:
1. A method for booting a processing device, the method comprising:
generating, by a monotonic counter during a first boot phase, a first count value;

transmitting, by the monotonic counter, the first count value to an access control circuit of a memory;
reading, based on the first count value, first data stored in the memory and associated with the first boot phase;
generating, by the monotonic counter during a second boot phase, a second count value greater than the first count, value;
transmitting, by the monotonic counter, the second count value to the access control circuit of the memory;
preventing, by the access control circuit based on the second count value, reading of the first data; and
reading, based on the second count value, second data stored in the memory and associated with the second boot phase.

2. The method according to claim 1, wherein the first data comprises first boot codes.

3. The method according to claim 2, wherein the first boot codes are executed prior to the monotonic counter generating the second count value, the first boot codes comprising an instruction to increment the monotonic counter to cause the generation of the second count value.

4. The method according to claim 1, wherein the memory is a volatile memory.

5. The method according to claim 1, wherein the memory is a non-volatile memory.

6. The method according to claim 1, wherein the access control circuit of the memory is configured to not authorize reading of the first data in response to a count value being greater than the first count value.

7. The method according to claim 1, further comprising:
prereading, based on the first count value during the first boot phase, the second data stored in the memory and associated with the second boot phase.

8. The method according to claim 1, wherein:
the first count value corresponds to an initialization value of the monotonic counter upon a first boot of the processing device, and
the method further comprises a second boot of the processing device during which the monotonic counter is initialized to the second count value.

9. The method according to claim 8, further comprising a third boot of the processing device, after the first boot and the second boot, at which the monotonic counter is initialized again to the first count value in response to a condition on a state of the processing device being satisfied.

10. The method according to claim 9, wherein the condition on the state of the processing device corresponds to a programming state of one or more bits stored in a non-volatile manner in an area of the memory or of another memory.

11. The method according to claim 1, further comprising:
reading, prior to generating the second count value and based on the first count value, one or more first encryption keys stored in the memory, the access control circuit of the memory being configured to not authorize reading of the first encryption keys in response to a count value being greater than the first count value.

12. The method according to claim 11, further comprising:
reading, after generating the second count value and based on the second count value, one or more second encryption keys stored in the memory.

13. A method for booting a processing device, the method comprising:
(a) executing a first boot phase comprising:
generating, by a monotonic counter a first count value,
transmitting, by the monotonic counter, the first count value to an access control circuit of a memory, and
reading, based on the first count value, first data stored in the memory; and
(b) executing a second boot phase comprising:
irreversibly incrementing the monotonic counter to a second count value greater than the first count value,
transmitting, by the monotonic counter, the second count value to the access control circuit of the memory,
preventing, by the access control circuit based on the second count value, reading of the first data, and
reading, based on the second count value, second data stored in the memory and associated with the second boot phase.

14. The method of claim 13, further comprising:
rebooting the processing device to reset the monotonic counter; and
repeating steps (a) and (b).

15. The method of claim 13, wherein:
the second data is associated with an isolation level equal to the second count value; and
executing the second boot phase further comprises reading, based on the second count value, third data, the third data being associated with an isolation level greater than the second count value.

16. A data processing device comprising:
a monotonic counter configured to:
generate a first count value for a first boot phase; and
after generating the first count value, generate a second count value for a second boot phase, wherein the second count value is greater than the first count value; and
a memory including an access control circuit and containing first and second boot codes, wherein the access control circuit is configured to:
read, based on the first count value during the first boot phase, the first boot code;
prevent, based on the second count value during the second boot phase, reading of the first boot code; and
read, based on the second count value during the second boot phase, the second boot code.

17. The data processing device of claim 16, wherein the memory is a volatile memory.

18. The data processing device of claim 16, wherein the memory is a non-volatile memory.

19. The data processing device of claim 16, wherein the monotonic counter is further configured to only increment generated count values and to re-initialize based on a condition on a state of the data processing device being satisfied.

* * * * *